(12) United States Patent
Pectol

(10) Patent No.: US 10,492,632 B2
(45) Date of Patent: Dec. 3, 2019

(54) BUFFET TABLE WITH LEGS

(71) Applicant: Mity-Lite, Inc., Orem, UT (US)

(72) Inventor: Matthew Pectol, Provo, UT (US)

(73) Assignee: Mity-Lite, Inc., Orem, UT (US)

( * ) Notice: Subject to any disclaimer, the term of this patent is extended or adjusted under 35 U.S.C. 154(b) by 80 days.

(21) Appl. No.: 15/716,137

(22) Filed: Sep. 26, 2017

(65) Prior Publication Data

US 2019/0090664 A1   Mar. 28, 2019

(51) Int. Cl.

| | |
|---|---|
| *A47F 10/06* | (2006.01) |
| *A47B 7/00* | (2006.01) |
| *A47B 31/00* | (2006.01) |
| *B60B 33/00* | (2006.01) |
| *A47B 3/06* | (2006.01) |
| *A47F 3/00* | (2006.01) |
| *A47B 96/20* | (2006.01) |

(52) U.S. Cl.
CPC .............. *A47F 10/06* (2013.01); *A47B 7/00* (2013.01); *A47B 31/00* (2013.01); *B60B 33/0002* (2013.01); *B60B 33/0039* (2013.01); *A47B 3/06* (2013.01); *A47B 2096/207* (2013.01); *A47B 2200/0063* (2013.01); *A47F 3/004* (2013.01)

(58) Field of Classification Search
CPC ... A47B 3/06; A47B 3/004; A47B 2200/0063; A47F 10/06; A47F 3/004
USPC ...... 108/158.12, 153.1, 155, 157.1; 403/295, 403/403; 312/140.1–140.4, 140, 257.1, 312/265.1–265.4; 248/188, 188.1, 188.8; 52/287.1, 653.1, 656.9
See application file for complete search history.

(56) References Cited

U.S. PATENT DOCUMENTS

| | | | | |
|---|---|---|---|---|
| 2,855,260 | A | * 10/1958 | Reiss | A47B 47/03 211/186 |
| 3,875,712 | A | * 4/1975 | Thompson | E04B 1/2403 108/153.1 |
| 2013/0160229 | A1 | * 6/2013 | Lin | B25H 1/02 15/268 |

* cited by examiner

*Primary Examiner* — Janet M Wilkens
(74) *Attorney, Agent, or Firm* — Thorpe, North & Western, LLP

(57) ABSTRACT

A banquet-type table has a tabletop on a stand. The stand comprises upright legs interconnected by upper and lower spars. Each leg comprises an elongated shell with an exterior wall intermediate a pair of lateral walls. The exterior wall is oriented to face outwardly, and the pair of lateral walls is oriented to face adjacent legs. Each leg further comprises a pair of top notches formed in a top of the pair of lateral walls, forming a top shelf. A respective upper spar is received in the pair of top notches, and is disposed on the top shelf. Each leg further comprises a pair of bottom notches formed in a bottom of the pair of lateral walls, forming a bottom lip. A respective lower spar is received in the pair of bottom notches. The bottom lip is disposed on the respective lower spar.

19 Claims, 7 Drawing Sheets

BUFFET TABLE WITH LEGS

BACKGROUND

Field of the Invention

The present invention relates generally to buffet tables, and more particularly, to a leg thereof.

Related Art

In the hospitality industry, such as banquets or events, buffet tables are frequently used to provide presentation surfaces for food. It is often desirable that such tables be portable and sturdy so that they can be quickly and efficiently positioned for an event or banquet, as well and quickly and efficiently stored. In addition, it is often desirable that such tables also be aesthetically pleasing. The goals of a portable, sturdy and aesthetic table can often compete against one another.

SUMMARY OF THE INVENTION

It has been recognized that it would be advantageous to develop a buffet table to address the issues and challenges present in the market, some of which are outlined above. In addition, it has been recognized that it would be advantageous to develop a buffet table that is portable, sturdy and aesthetically pleasing. Furthermore, it has been recognized that it would be advantageous to develop a buffet table that facilitates manufacture.

The invention provides a table with a tabletop coupled to and disposed upon a stand. The stand comprises upright legs interconnected by upper and lower spars. Each leg comprises an elongated shell with an exterior wall intermediate a pair of lateral walls. The exterior wall is oriented to face outwardly, and the pair of lateral walls is oriented transverse to the exterior wall, and to face adjacent legs. Each leg further comprises a top notch formed in each of the lateral walls at a top thereof, defining a pair of top notches forming a top shelf. A respective upper spar is received in at least one of the pair of top notches, and is disposed on the top shelf. Each leg further comprises a bottom notch formed in each of the lateral walls at a bottom thereof, defining a pair of bottom notches forming a bottom lip. A respective lower spar is received in at least one of the pair of bottom notches. The bottom lip is disposed on the respective lower spar.

In one aspect, the upright legs can be or can comprise corner legs. Each corner leg can comprise a pair of exterior walls adjoining one another at a first corner, and oriented to face in substantially perpendicular directions. The pair of lateral walls adjoin opposite sides of the pair of exterior walls at second corners, with each lateral wall oriented substantially perpendicularly with respect to an adjoining exterior wall and the other lateral wall. The pair of exterior walls, the pair of lateral walls, the first corner and the second corners form the elongated shell with four walls and three corners and open along an elongated gap between outermost lateral edges of the pair of lateral walls.

In another aspect, a tab-and-groove connection can be formed between each intersecting leg and spar. The tab-and-groove connection can include a tab extending from one of the intersecting leg and spar, and into a groove in the other of the intersecting leg and spar. The tab can be disposed inside the stand. A weld can be formed between the tab and a surround of the groove, and thus disposed inside the stand.

The invention also provides method for making legs of a table. The method comprises:

1) Cutting leg blanks from a sheet, with the leg blanks including notches in corners thereof.

2) Bending the leg blanks to form elongated shells, each with a pair of exterior walls adjoining a first bend, and a pair of lateral walls adjoining opposite sides of the pair of exterior walls about second bends, and with the notches opposite one another in pairs to form a pair of top notches and a pair of bottom notches, the top notches defining a top shelf and the bottom notches defining a bottom lip.

In one aspect, the method can further comprise making a frame of a table with the legs. The method can further comprise:

3) Disposing the table legs on lower spars extending between adjacent table legs, with the pair of bottom notches of each of the table legs receiving at least one of the lower spars, and with the bottom lip of each of the table legs disposed on a lower spar, with an intersection defined between respective table legs and lower spars.

4) Disposing upper spars on the table legs with the upper spars extending between adjacent table legs, with the pair of top notches of each of the table legs receiving at least one upper spar, and with the top shelf of each of the table legs receiving a respective upper spar, an intersection defined between respective table legs and upper spars.

5) Connecting the table legs to the upper and lower spars at each intersection. Connecting the table legs to the upper and lower spars can further comprise inserting a tab into a groove for each intersection, with the tab extending from one of the table leg or the upper or lower spar into the groove in the other of the table leg or the upper or lower spar, with the tab disposed inside the stand. The tab can be welded to a surround of the groove inside the stand.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
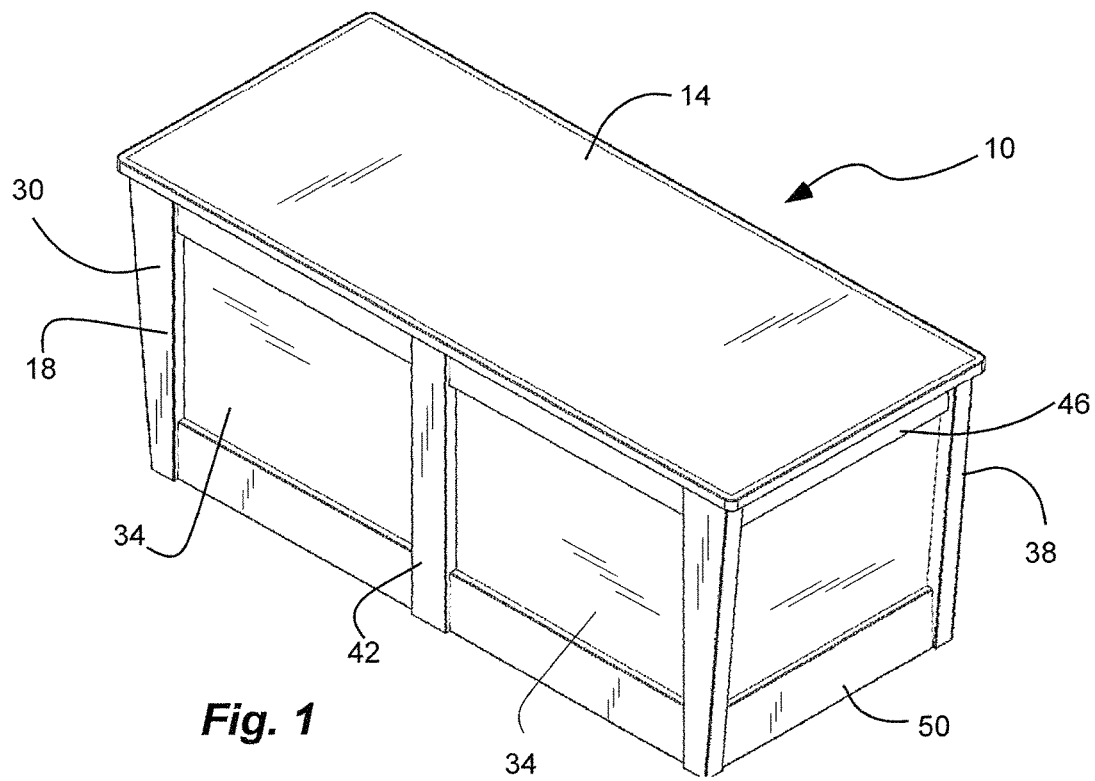
FIG. 1 is a perspective view of a buffet-type table having a stand and legs in accordance with an embodiment of the present invention.
Figure 2:
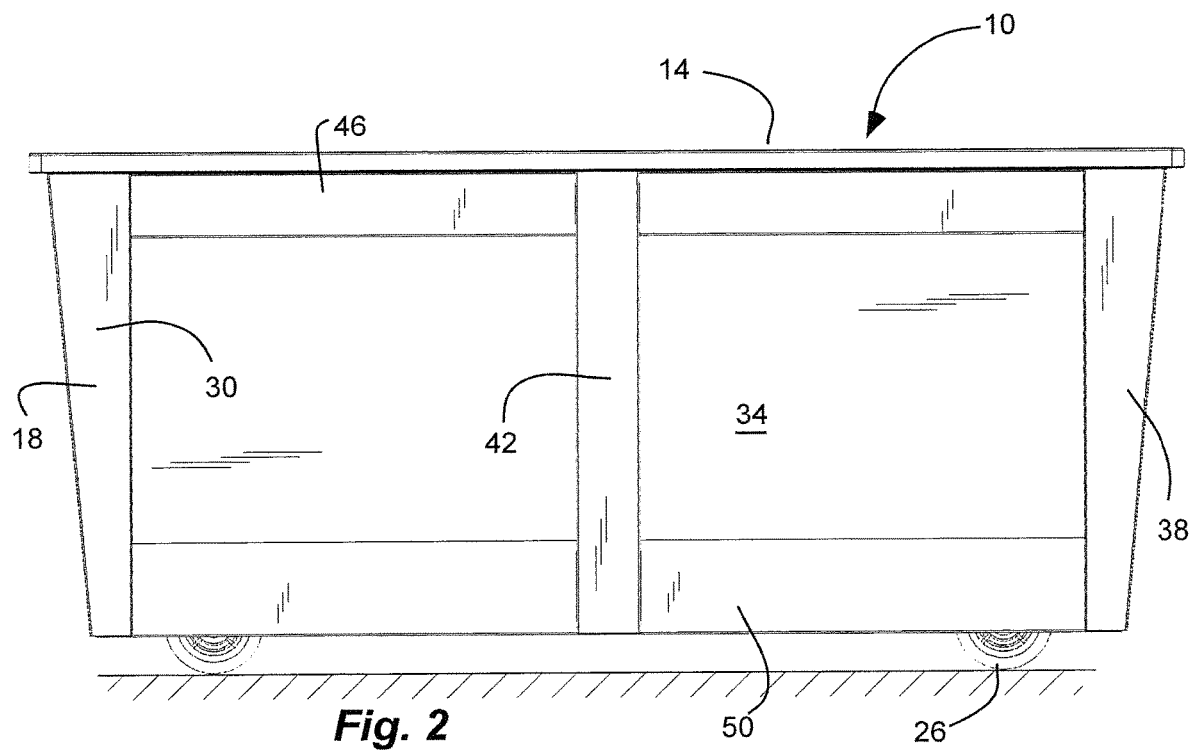
FIG. 2 is a front view of the buffet-type table with the stand and the legs of FIG. 1.
Figure 3:
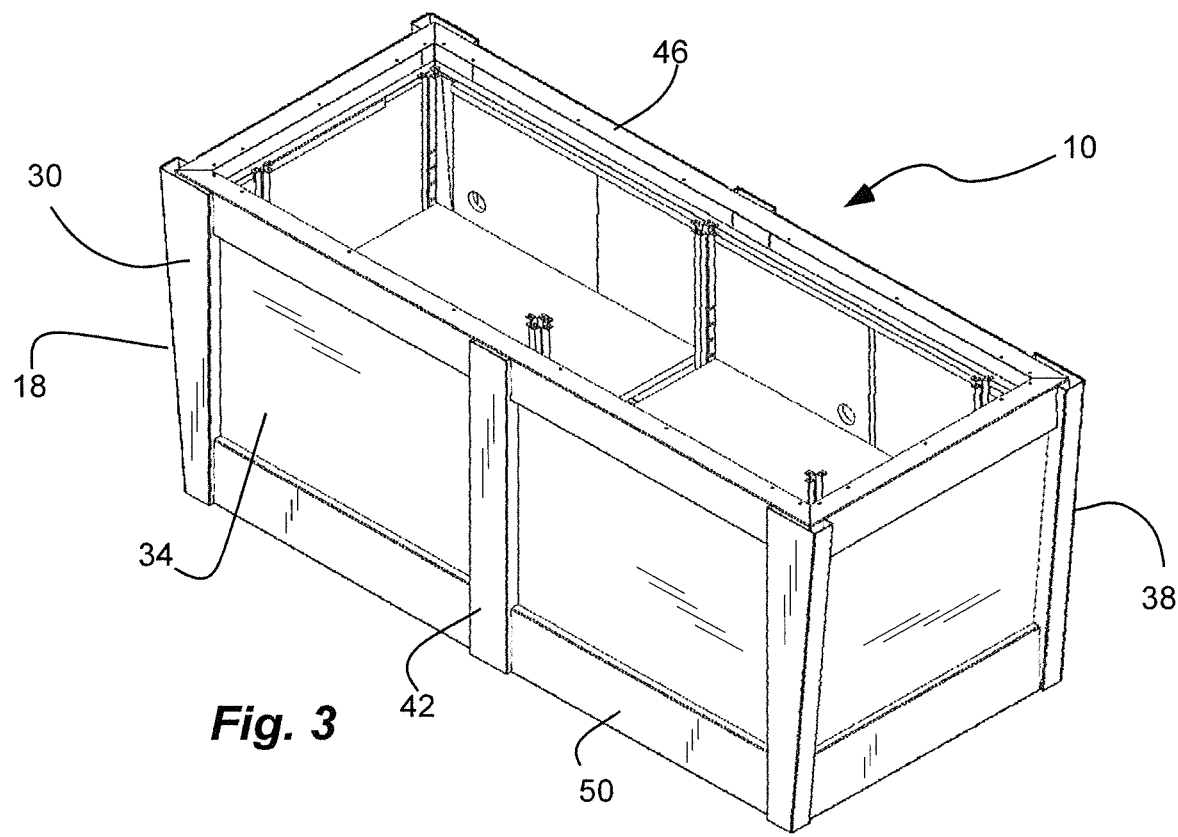
FIG. 3 is a partial perspective view of the buffet-type table with the stand and the legs of FIG. 1, shown with a tabletop removed from the stand.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, in the same general region or area as each other, or the next proximate one in a series, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, sizes, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment. Furthermore, the described features, structures, or characteristics may be combined in any suitable manner in one or more embodiments. In this description, numerous specific details are provided, such as examples of layouts, distances, network examples, etc. One skilled in the relevant art will recognize, however, that many variations are possible without one or more of the specific details, or with other methods, components, layouts, measurements, etc. In other instances, well-known structures, materials, or operations are not shown or described in detail but are considered well within the scope of the disclosure.

Example Embodiments

An initial overview of technology embodiments is provided below and specific technology embodiments are then described in further detail. This initial summary is intended to aid readers in understanding the technology more quickly but is not intended to identify key or essential features of the technology nor is it intended to limit the scope of the claimed subject matter.

A table, such as a buffet table or banquet or event table, is provided. The table has a tabletop coupled to and disposed upon a stand. The stand is disposed over a support surface, such as the ground or the floor. The stand can be disposed on a wheeled platform to facilitate movement on the support surface, such as by rolling. Thus, the wheeled platform can have wheels or coasters. In one aspect, the tabletop and the stand can be elongated and rectangular to provide sufficient surface area for serving food. The stand can be partially or fully enclosed. Thus, the stand can further comprise a frame carrying interchangeable or replaceable panels. Thus, different panels can be manufactured separately from the stand or frame, and selectively coupled to the stand or the frame based on a customer's order. Alternatively, a user can selectively interchange different panels as desired, such as to suit a function or room decor. The different panels can have different exposed surfaces, such as colors or finishes, or can be formed of different materials, such as metal or wood, etc.

In one aspect, the stand or the frame can be formed of upright legs, and lateral or horizontal spars interconnecting the legs. The upright legs can include corner legs located at the corners of the stand or table, and intermediate legs disposed intermediate the corners or the corner legs. The spars can comprise upper and lower spars disposed on a top and a bottom of the stand, or a top and a bottom of the legs. In one aspect, the legs can be formed of sheet metal bent to form an elongated shell. The shell can have an upper ledge to receive the upper spars, and a lower lip or undercut to receive the lower spars. The sheet metal of the shell or leg can allow the leg to have different desired shapes or profiles, and to provide structure, such as the upper ledge and the lower lip or undercut, to receive the spars.

In another aspect, the legs and the spars can be coupled together at intersections by connections, such as tab-and-groove connections, welds, or both. In one aspect, the connections can be located inside the stand, or inside the legs or the spars, to provide exposed surfaces free of visual attachments. In one aspect, a tab can extend from one of the leg or the spar (such as the leg), and into a groove in the other of the leg or the spar (such as the spar). A weld can be formed between the tab and a surround of the groove, and can thus be located inside the stand.

Figure 4:
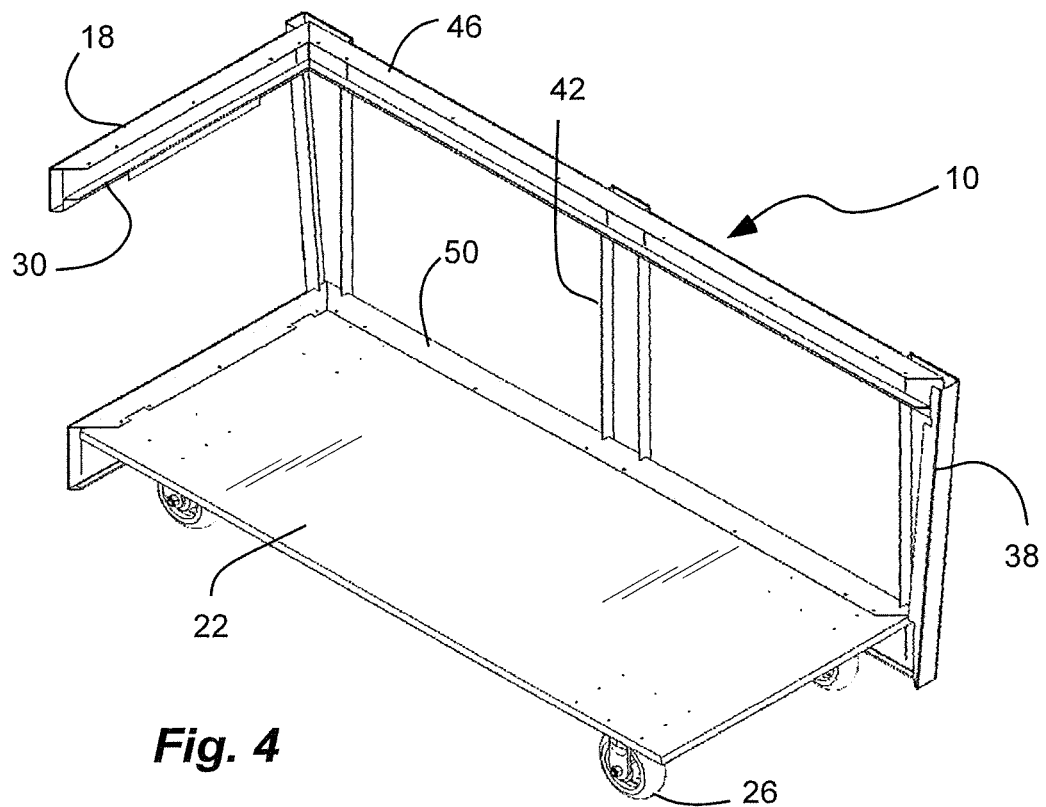
FIG. 4 is a partial perspective view of the buffet-type table with the stand and the legs of FIG. 1, shown with the tabletop, panels, and some of the stand removed.
Figure 5:
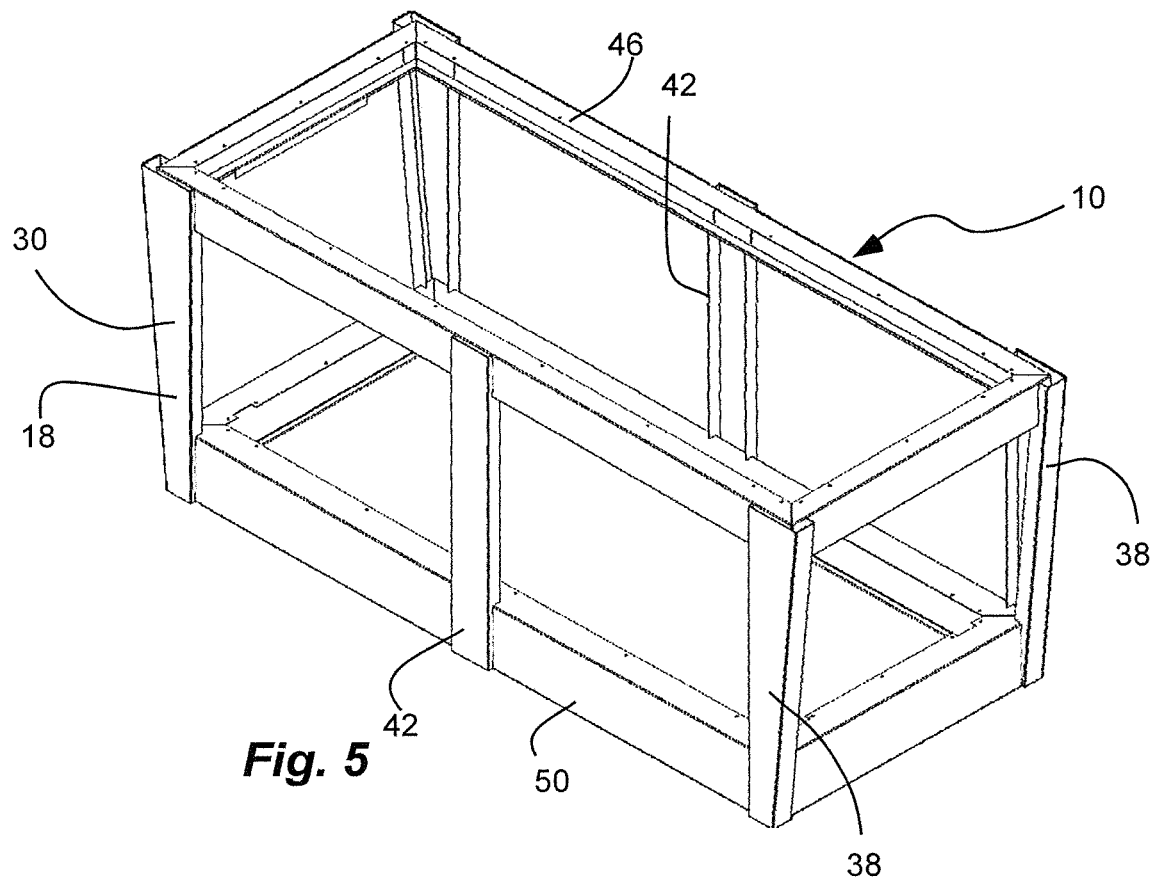
FIG. 5 is a perspective view of the stand of the buffet-type table of FIG. 1.
Figure 6:
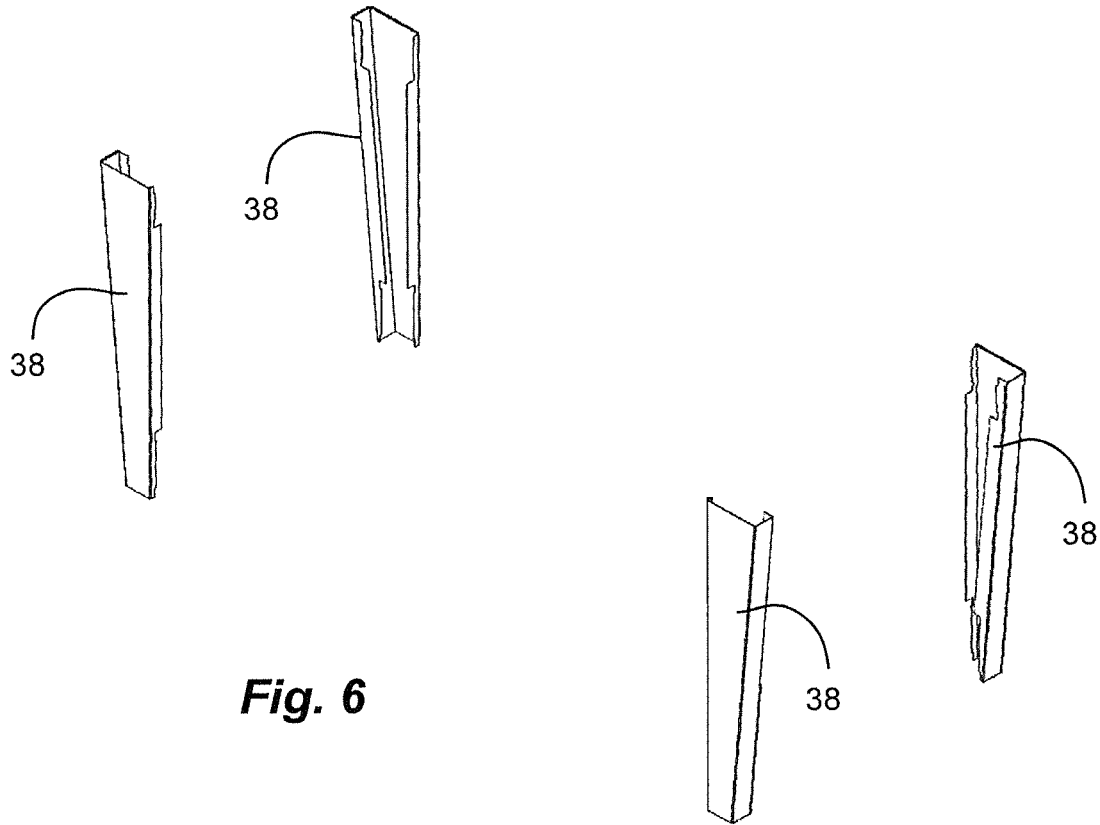
FIG. 6 is a perspective view of the legs of the buffet-type table of FIG. 1.

As illustrated in FIGS. 1-14, a buffet-type table, indicated generally at 10, in an example implementation in accordance with the invention is shown. The table 10 can be adapted for banquets or events, and can present items, such as food, dishes, warming trays, chaffing dishes, etc., thereon. The table 10 can provide a horizontal presentation surface to receive items thereon. The table 10 comprises a tabletop 14 coupled to and disposable upon a stand 18. The stand 18 is disposable over a support surface, such as the floor or the ground. The stand 18 can also be disposed upon a wheeled platform 22 with wheels or castors 26 that can roll across the support surface, as shown in FIGS. 4 and 12. The stand 18 can comprise a frame 30 with openings. The stand 18 can be wholly or partially enclosed, and can receive panels 34 in or at the openings. Thus, the panels 34 can cover or span the openings in the frame 30. The panels 34 can be recessed with respect to the frame 30, or exterior surfaces thereof. The frame 30 and the panels 34 can have exterior exposed surfaces that present an aesthetically pleasing appearance. In addition, the surface finishes of the frame 30 and the panels 34 can be different to provide a contrast, such as a metal frame and wood or faux-wood panels.

The stand 18 or the frame 30 comprises upright legs and lateral or horizontal spars interconnecting the legs. The legs and spars are interconnected at intersections. The upright legs can comprise corner legs 38 located at corners of the stand 18 or the frame 30, as well as intermediate legs 42 disposed intermediate the corner legs 38. The spars can comprise upper spars 46 located at the top of the stand 18 or the frame 30, and at a top of the legs 38 and 42. Similarly, the spars can comprise lower spars 50 located at a bottom of the stand 18 or the frame 30, and at a bottom of the legs 38 and 42. The spars 46 and 50 can be disposed inside the legs 38 and 42 and recessed with respect to the legs 38 and 42, or exterior surfaces thereof. Thus, the legs 38 and 42 can provide the primary support. The panels 34 can be recessed with respect to the legs 38 and 42, and the spars 46 and 50. Thus, the frame 30, or the legs and spars, can be more prominent.

The legs 38 and 42, as well as the spars 46 and 50, can be formed of sheet metal, as described in greater detail below. Thus, the stand 18 or the frame 30 can be formed of sheet metal. The legs 38 and 42 can comprise an elongated shell formed by sheet metal that is cut or stamped, and folded to form the shell, and thus the leg. The shell can have walls with substantially the same thickness defining a hollow therein. The shell can have at least one exterior wall oriented to face outwardly, and a pair of lateral walls oriented transverse to the exterior wall(s) and to face adjacent legs. The lateral walls can adjoin the exterior wall(s). Thus, the exterior wall(s) faces outwardly while the lateral walls face laterally towards the next or proximate leg. A gap can be formed between the lateral sides of the shell, or the outermost lateral edges of the pair of lateral walls. The shell can use less material than a solid leg, while the gap allows the shell to be formed of sheet stock material.

Figure 10:
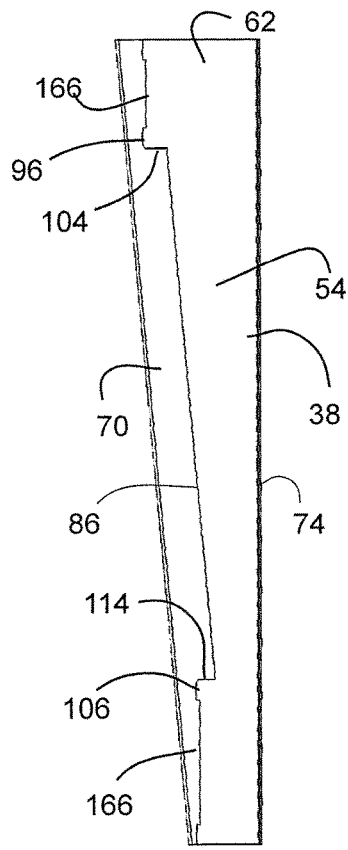
FIG. 10 is a front view of the leg of the buffet-type table of FIG. 1.
Figure 9:
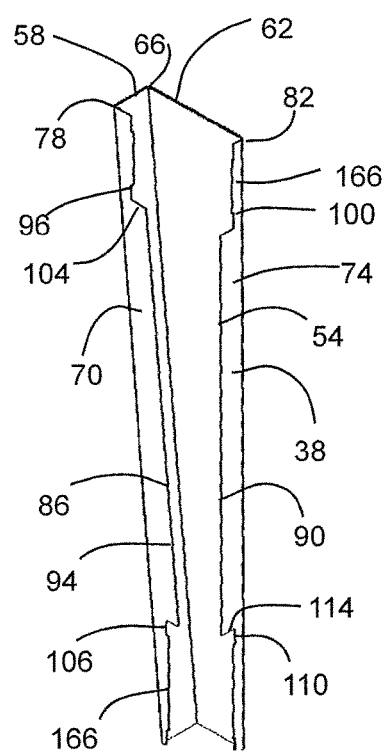
FIG. 9 is a perspective view of a leg of the buffet-type table of FIG. 1.
Figure 11:
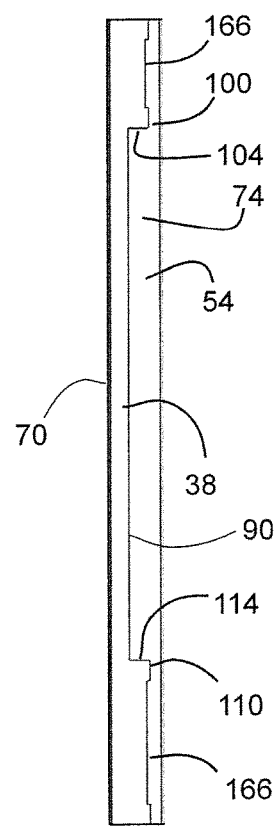
FIG. 11 is a side view of the leg of the buffet-type table of FIG. 1.
Figure 12:
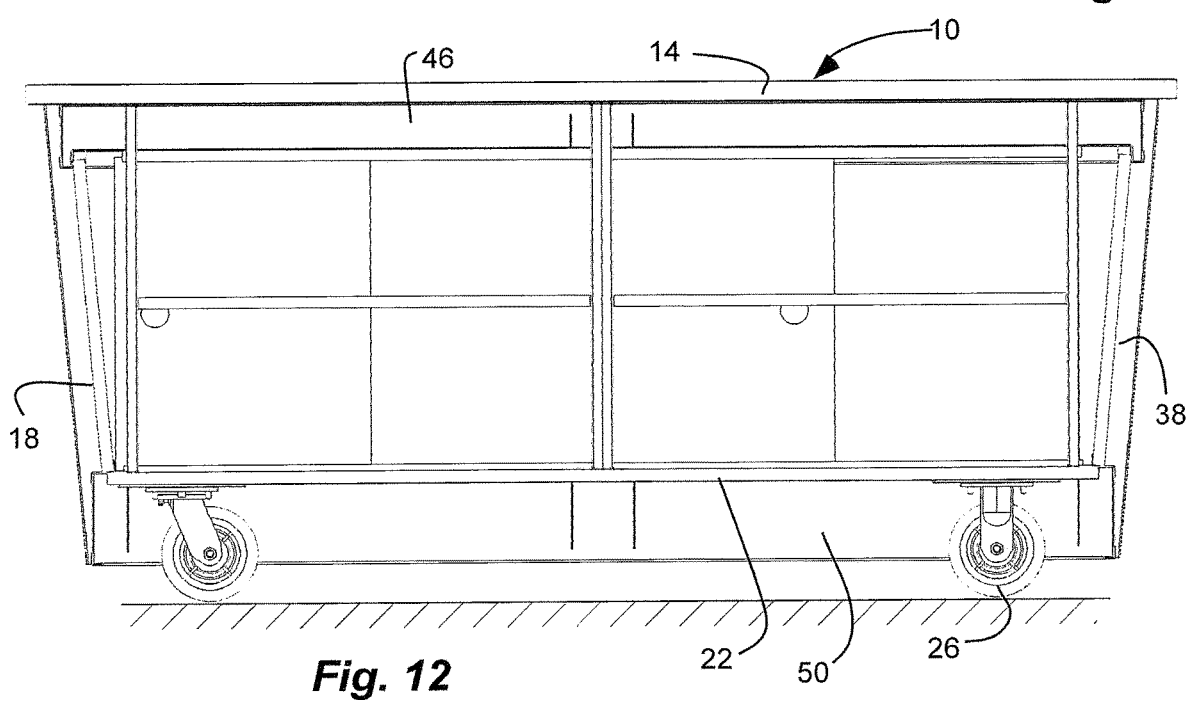
FIG. 12 is a cross-sectional front view of the buffet-type table of FIG. 1.

Referring to FIGS. 9-11, the corner legs 38 can each comprise an elongated shell 54 with a hollow interior formed by four walls and three corners, and open along an elongated gap between lateral sides of the shell, or outermost lateral edges of the pair of lateral walls. Thus, the shell can have a rectangular or square cross-sectional shape, but with only three corners and with a missing corner. The elongated shell 54 and the corner leg 38 comprise a pair of exterior walls 58 and 62 adjoining one another at a first corner 66 or bend. The exterior walls 58 and 62 are oriented to face outwardly with respect to the table 10, the stand 18 and the frame 30, and in substantially perpendicular directions with respect to one another. Thus, the exterior walls 58 and 62 can be oriented substantially perpendicular to one another. In addition, the elongated shell 54 and the corner legs 38 comprise a pair of lateral walls 70 and 74 adjoining opposite sides of the pair of exterior walls 58 and 62 at second corners 78 and 82 or bends, respectively. The lateral walls 70 and 74 are oriented substantially perpendicularly with respect to an adjoining exterior wall 58 and 62, respectively, and with respect to one another. The lateral walls 70 and 74 are also oriented to face adjacent legs, or the next or proximate leg. As described above, the pair of exterior walls 58 and 62, the pair of lateral walls 70 and 74, the first corner 66 and the second corners 78 and 82 form the elongated shell 54 with four walls and three corners. The lateral walls 70 and 74 have outermost lateral edges 86 and 90, respectively, that define lateral sides of the shell 54. The shell 54 is open along an elongated gap 94 between outermost lateral edges 86 and 90 of the pair of lateral walls 70 and 74, and the lateral sides of the shell. The shell 54 can be formed of metal, and can be formed by stamping and bending.

In addition, the corner legs 38 and the shell 54 comprise a top notch formed in each of the lateral walls 70 and 74 at a top thereof defining a pair of top notches 96 and 100, and forming a top shelf 104. A respective upper spar 46 is received in at least one of the pair of top notches 96 and 100, and disposed on the top shelf 104. In one aspect, each of the top notches 96 and 100 receives a different, or opposite, top spar 46, with each of the top spars 46 disposed on the top shelf 104. Similarly, a bottom notch is formed in each of the lateral walls 70 and 74 at a bottom thereof defining a pair of bottom notches 106 and 110, and forming a bottom lip 114. A respective lower spar 50 is received in at least one of the pair of bottom notches 106 and 110. In addition, the bottom lip 114 is disposed on the respective lower spar 54. In one aspect, each of the bottom notches 106 and 110 receives a different, or opposite, bottom spar 50, with the bottom lip 114 disposed on each of the bottom spars 50.

Figure 13:
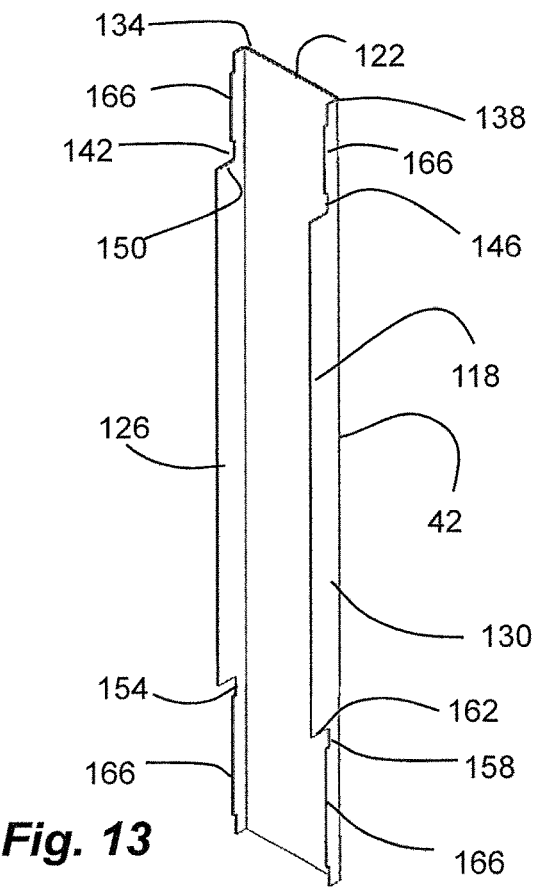
FIG. 13 is a perspective view of an intermediate leg of the buffet-type table of FIG. 1.
Figure 14:
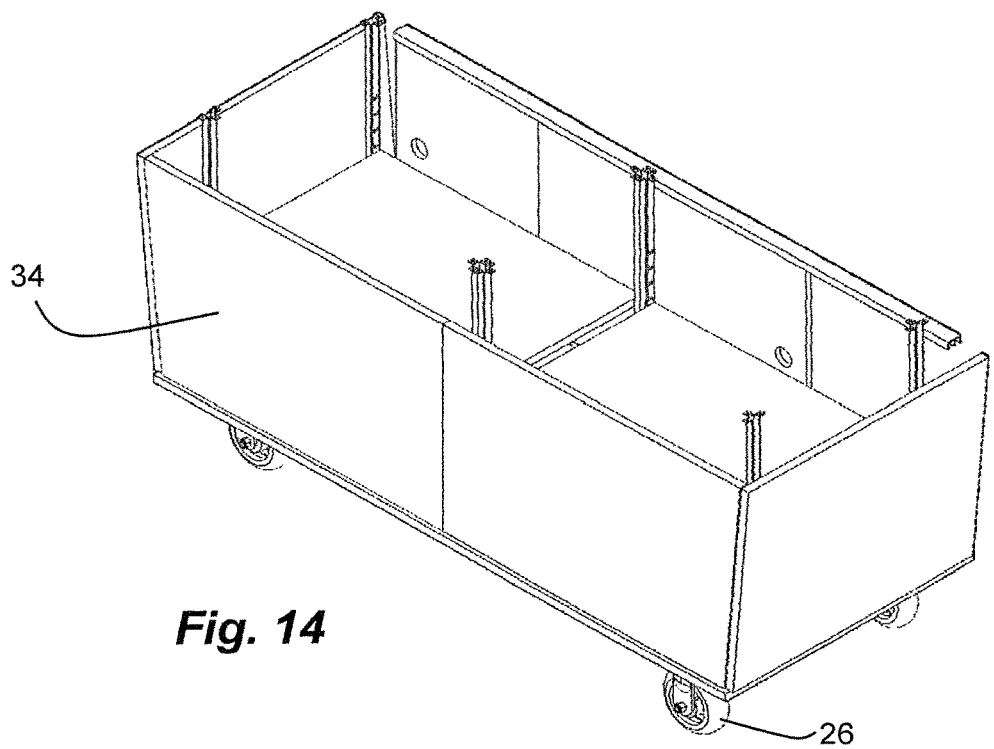
FIG. 14 is a perspective view of the buffet-type table of FIG. 1, shown with the tabletop and the stand removed to show the panels.

Referring to FIG. 13, the intermediate legs 42 can be similar to the corner legs 38, and can each comprise an elongated shell 118 with a hollow interior formed by three walls and two corners, and open along an elongated gap between lateral sides of the shell, or outermost lateral edges of the pair of lateral walls. Thus, the shell can form an elongated channel. The elongated shell 118 and the intermediate leg 42 comprise an exterior wall 122 oriented to face outwardly, and a pair of lateral walls 126 and 130 adjoining opposite sides of the exterior wall 122 at corners 134 and 138 or bends. The lateral walls 126 and 130 are oriented transverse to the exterior wall 122, and are oriented and to face adjacent legs, or the next or proximate leg.

As described above with respect to the corner legs 38, the shell 118 and the intermediate leg 42 comprise a top notch formed in each of the lateral walls 126 and 130 at a top thereof defining a pair of top notches 142 and 146 forming a top shelf 150. A respective upper spar 46 is received in at least one of the pair of top notches 142 and 146, and disposed on the top shelf 150. In one aspect, each of the top notches 142 and 146 receives a single top spar 46 extending uninterrupted through each top notch. In another aspect, each of the top notches 142 and 146 receives a different, or opposite, top spar 46, with each of the top spars 46 disposed on the top shelf 150. Similarly, the shell 118 and the intermediate leg 42 comprise a bottom notch formed in each of the lateral walls 126 and 130 at a bottom thereof defining a pair of bottom notches 154 and 158 and forming a bottom lip 162 or undercut. A respective lower spar 50 is received in at least one of the pair of bottom notches 154 and 158. In addition, the bottom lip 158 is disposed on the respective lower spar 54. In one aspect, each of the bottom notches 154 and 158 receives a single bottom spar 50 extending uninterrupted through each bottom notch. In another aspect, each of the bottom notches 154 and 158 receives a different, or opposite, bottom spar 50, with the bottom lip 162 disposed on each of the bottom spars 50.

Referring again to FIGS. 9-11, in one aspect, the first corner 66 or bend between the adjoining exterior walls 58 and 62 can be angled and non-parallel with respect to the lateral walls 70 and 70, and the second corners 78 and 82 or bends. Thus, the adjoining exterior walls 58 and 62 can be wider at one end, such as the top, and narrower at the other end, such as the bottom. The shell 54 can taper from one end to the other. The tapered shell 54 can provide a stand 18 with a narrower bottom to provide a toe kick area.

Figure 7:
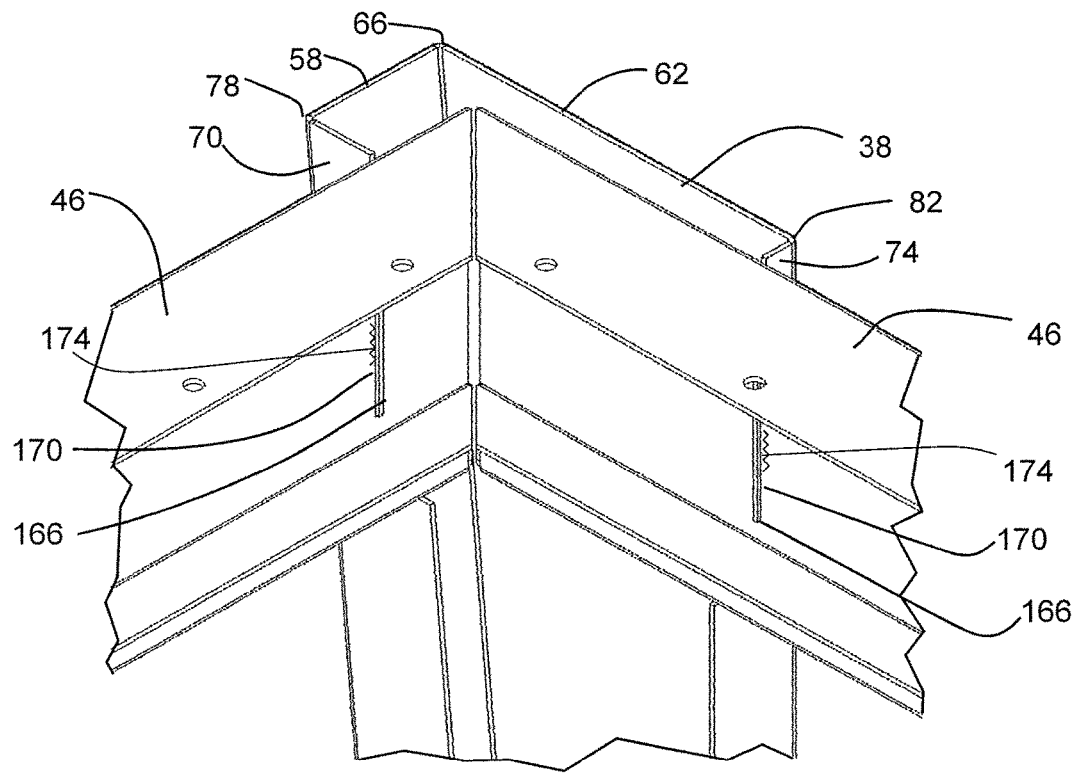
FIG. 7 is a partial perspective top view of the buffet-type table of FIG. 1, shown with the tabletop removed from the stand, and showing an intersection of top spars with a top of a leg.
Figure 8:
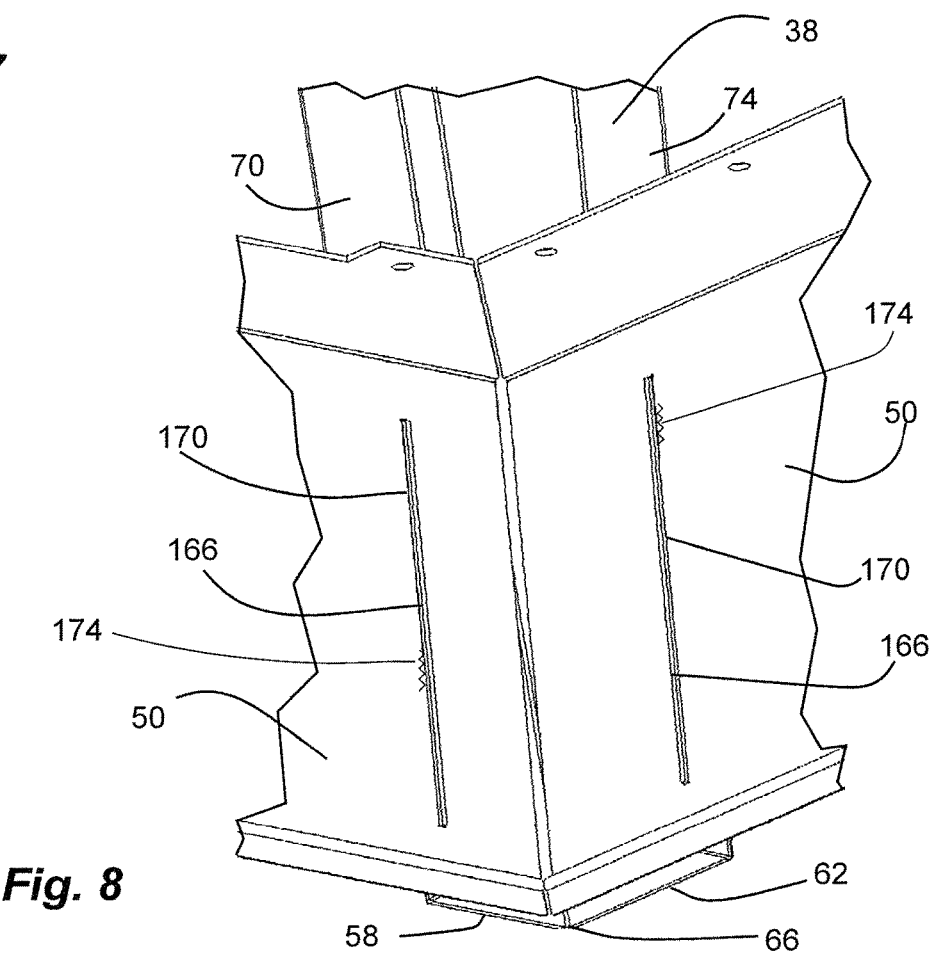
FIG. 8 is a partial perspective bottom view of the buffet-type table of FIG. 1, shown with a wheeled platform removed from the stand, and showing an intersection of bottom spars with a bottom of a leg.

Referring to FIGS. 4, 7 and 8, the corner legs 38, and the intermediate legs 42, are coupled to the upper and lower spars 46 and 50 where the legs and the spars intersect one another. All attachments or fasteners connecting the legs 38 and 42 to the spars 46 and 50 can be located in an interior of the stand 18, the frame 30, and the legs 38 and 42 and the spars 46 and 50 themselves. The legs 38 and 42 and the spars 46 and 50, and thus the stand 18 and the frame 30, have exposed surfaces free of visual attachments. An intersection is defined between each leg 38 or 42 and each spar 46 or 50. A connection can be formed between each intersection. The connections can be hidden connections, and can be located inside the stand. In one aspect, the connection can be a tab-and-groove connection formed between each intersecting leg and spar. The tab-and-groove connection can include a tab 166 extending from one of the intersecting leg and spar, and into a groove 170 in the other of the intersecting leg and spar. In one aspect, the tab 166 can be part of the leg 38 and 42, and the groove 170 can be part of the spar 46 or 50. The tab 166 can extend through the groove 170 from outside the frame to inside the stand 18 and the frame 30, and is thus disposed inside the stand 18 and the stand 30. A weld 174 can be formed between the tab 166 and a surround of the groove 170, and is thus also disposed inside the stand 18 and the frame 30.

Referring to FIGS. 4 and 12, the lower spars 50, and thus the stand 18 and the frame 30 can be disposed on the wheeled platform 22, and the wheels or castors 26 can be recessed in a cavity formed by the lower spars 50 and the platform.

Figure 15:
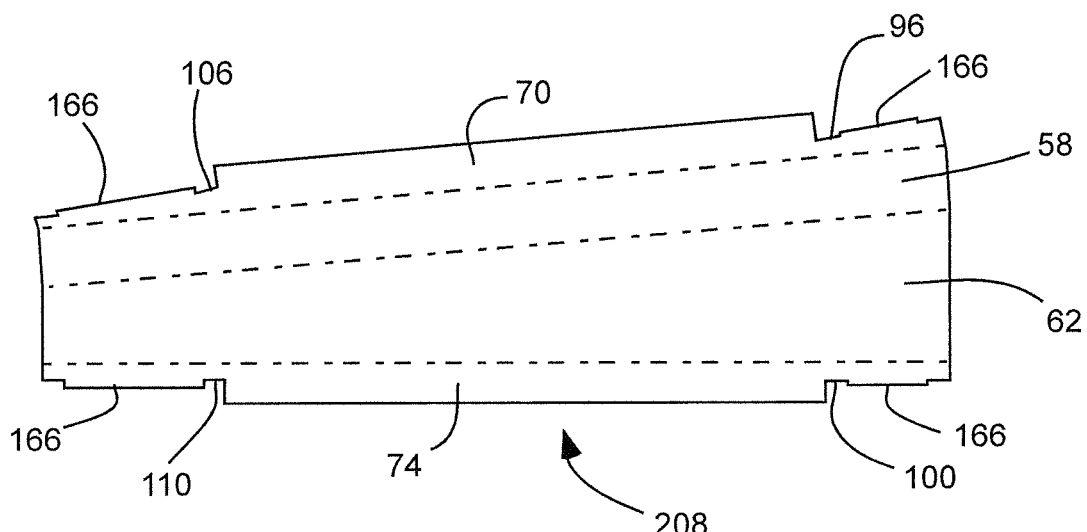
FIG. 15 is a top view of a leg blank of a leg of the buffet-style table of FIG. 1.
Figure 16:
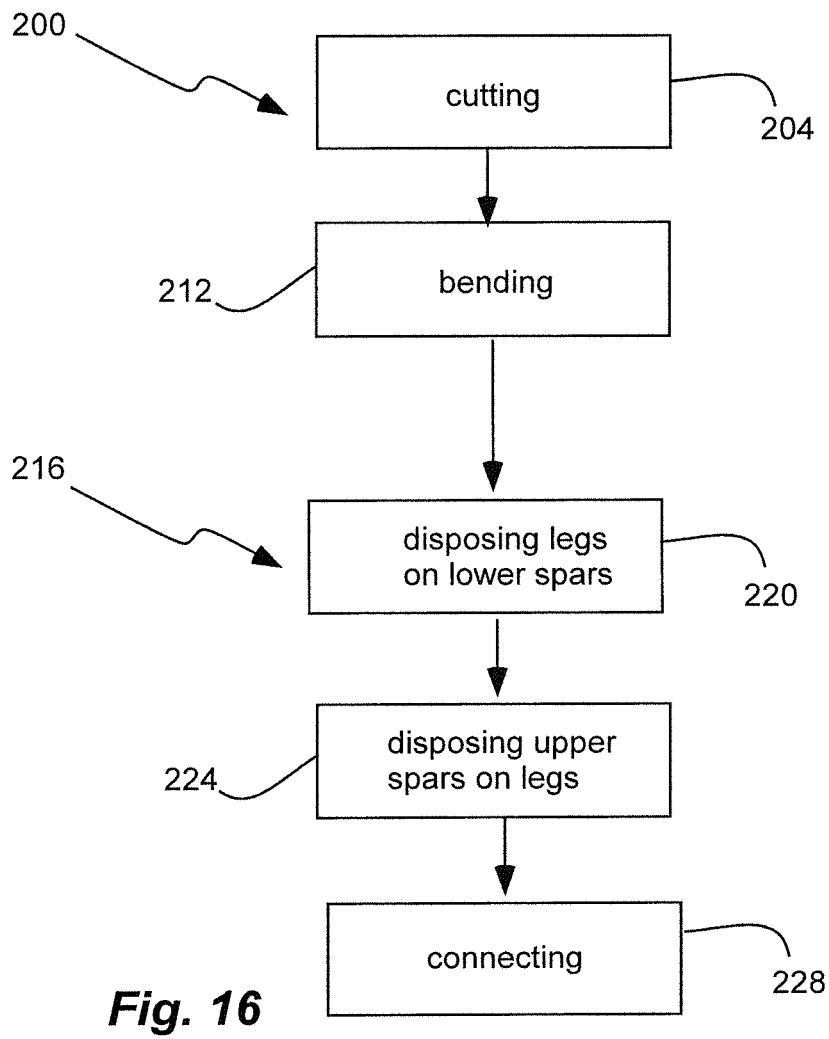
FIG. 16 is a flow chart of a method of making the legs and the buffet-style table of FIG. 1.

Referring to FIGS. 15 and 16, a method 200 for making legs 38 of a table 10 comprises:

1) Cutting 204 leg blanks 208 from a sheet. The sheet can be a metal sheet stock, such as aluminum. The cutting can be done by stamping. The leg blanks 208 can include all the features of the legs 38, but without the corners or bends. Thus, the leg blanks can include the notches 96, 100, 106 and 110 in corners thereof.

2) Bending 212 the leg blanks 208 to form elongated shells 54. Each shell 54 can have a pair of exterior walls 58 and 62 adjoining a first bend 66, and a pair of lateral walls 70 and 74 adjoining opposite sides of the pair of exterior walls about second bends 78 and 82. The notches can be opposite one another in pairs to form a pair of top notches 96 and 100, and a pair of bottom notches 106 and 110. The top notches 96 and 100 define a top shelf 104, and the bottom notches 106 and 110 defining a bottom lip 114.

A method 216 for making a stand 18 or frame 30 of the table 10 comprises:

1) Disposing 220 the table legs 38 on lower spars 50 extending between adjacent table legs. The pair of bottom notches 106 and 110 of each of the table legs 38 receive at least one of the lower spars 50. The bottom lip 114 of each of the table legs 38 is disposed on a lower spar 50. An intersection is defined between respective table legs 38 and lower spars 50.

2) Disposing 224 upper spars 46 on the table legs 38 with the upper spars extending between adjacent table legs. The pair of top notches 96 and 100 of each of the table legs 38 receives at least one upper spar 46. The top shelf 104 of each of the table legs 38 receives a respective upper spar 46. Again, an intersection is defined between respective table legs 38 and upper spars 46.

3) Connecting 228 the table legs 38 to the upper and lower spars 46 and 50 at each intersection. Connecting the table legs 38 to the upper and lower spars 46 and 50 can further comprise inserting 232 a tab 166 into a groove 170 for each intersection. The tab 166 can extend from one of the table leg 38 or the upper or lower spar 46 or 50, and into the groove 170 in the other of the table leg 38 or the upper or lower spar 46 and 50, with the tab 166 disposed inside the stand 18. The tab 166 can be welded to a surround of the groove 170 inside the stand 18.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A table, comprising:
    a) a stand configured to be disposed over a support surface;
    b) a tabletop coupled to and disposed upon the stand;
    c) the stand comprising upright legs interconnected by upper and lower spars;
    d) each leg comprising an elongated shell with an exterior wall intermediate a pair of lateral walls, with the exterior wall oriented to face outwardly, and the pair of lateral walls oriented transverse to the exterior wall and to face adjacent legs;
    e) each leg further comprising a top notch formed in each of the lateral walls at a top thereof and defining a pair of top notches forming a top shelf, a respective upper spar received in at least one of the pair of top notches and disposed on the top shelf;
    f) each leg further comprising a bottom notch formed in each of the lateral walls at a bottom thereof and defining a pair of bottom notches forming a bottom lip, a respective lower spar received in at least one of the pair of bottom notches, and the bottom lip being disposed on the respective lower spar;
    g) the pair of lateral walls of each leg having outermost lateral edges defining lateral sides of the shell: and
    h) an elongated gap between the lateral sides of the shell.

2. The table in accordance with claim 1, wherein the exterior wall and the pair of lateral walls of the shell have substantially the same thickness and defining a hollow therein.

3. The table in accordance with claim 1, wherein the upright legs comprise corner legs and wherein the elongated shell of each corner leg comprises:
    a pair of exterior walls adjoining one another at a first corner and oriented to face in substantially perpendicular directions;
    the pair of lateral walls adjoining opposite sides of the pair of exterior walls at second corners and oriented substantially perpendicularly with respect to one another and an adjoining exterior wall; and
    the pair of exterior walls, the pair of lateral walls, the first corner and the second corners forming the elongated shell with four walls and three corners.

4. The table in accordance with claim 1, wherein the upright legs comprise intermediate legs and wherein the elongated shell of each intermediate leg comprises:
    the exterior wall and the pair of lateral walls forming an elongated channel.

5. The table in accordance with claim 1, further comprising all attachments connecting the upright legs to the upper and the lower spars being located in an interior of the upright legs, or the upper and the lower spars, or both, so that the upright legs and the upper and the lower spars have exposed surfaces free of visual attachments.

6. The table in accordance with claim 1, further comprising:
    an intersection defined between each leg and each upper or lower spar; and
    a hidden connection formed between each intersection and located inside the stand.

7. The table in accordance with claim 1, further comprising:
    a tab-and-groove connection formed between each intersecting leg and spar, including a tab extending from one of the intersecting leg and spar and into a groove in the other of the intersecting leg and spar.

8. The table in accordance with claim 7, further comprising:

the tab being disposed inside the stand; and a weld formed between the tab and a surround of the groove, and thus disposed inside the stand.

9. The table in accordance with claim 1, further comprising:

each elongated shell comprising a rigid sheet with a bend between adjoining lateral and exterior walls.

10. A table, comprising:
   a) a stand configured to be disposed over a support surface;
   b) a tabletop coupled to and disposed upon the stand;
   c) the stand comprising upright corner legs disposed at corners of the stand;
   d) the stand comprising upper and lower spars extending between and interconnecting the upright corner legs;
   e) each corner leg comprising an elongated shell with:
      i) a pair of exterior walls adjoining one another at a first corner and oriented to face in substantially perpendicular directions;
      ii) a pair of lateral walls adjoining opposite sides of the pair of exterior walls at second corners and oriented substantially perpendicularly with respect to an adjoining exterior wall and one another, the pair of lateral walls oriented to face adjacent legs; and
      iii) the pair of exterior walls, the pair of lateral walls, the first corner and the second corners forming the elongated shell with four walls and three corners and open along an elongated gap between outermost lateral edges of the pair of lateral walls;
      iv) a top notch formed in each of the lateral walls at a top thereof and defining a pair of top notches forming a top shelf, a respective upper spar received in at least one of the pair of top notches and disposed on the top shelf; and
      v) a bottom notch formed in each of the lateral walls at a bottom thereof and defining a pair of bottom notches forming a bottom lip, a respective lower spar received in at least one of the pair of bottom notches, and the bottom lip being disposed on the respective lower spar.

11. The table in accordance with claim 10, further comprising:
   a) the stand further comprising intermediate legs disposed between corner legs;
   b) each intermediate leg comprising an elongated shell with:
      i) an exterior wall oriented to face outwardly;
      ii) a pair of lateral walls adjoining opposite sides of the exterior wall, and the pair of lateral walls oriented transverse to the exterior wall and to face adjacent legs;
      iii) a top notch formed in each of the lateral walls at a top thereof and defining a pair of top notches forming a top shelf, a respective upper spar received in at least one of the pair of top notches and disposed on the top shelf; and
      iv) a bottom notch formed in each of the lateral walls at a bottom thereof and defining a pair of bottom notches forming a bottom lip, a respective lower spar received in at least one of the pair of bottom notches, and the bottom lip being disposed on the respective lower spar.

12. The table in accordance with claim 10, further comprising all attachments connecting the upright corner legs to the upper and the lower spars being located in an interior of the upright corner legs, or the upper and the lower spars, or both, so that the upright corner legs and the upper and the lower spars have exposed surfaces free of visual attachments.

13. The table in accordance with claim 10, further comprising:
   a) an intersection defined between each corner leg and each upper or lower spar;
   b) a tab-and-groove connection formed between each intersecting leg and spar, including a tab extending from one of the intersecting leg and spar and into a groove in the other of the intersecting leg and spar;
   c) the tab being disposed inside the stand; and
   d) a weld formed between the tab and a surround of the groove, and thus disposed inside the stand.

14. A table, comprising:
   a) a stand configured to be disposed over a support surface;
   b) a tabletop coupled to and disposed upon the stand;
   c) the stand comprising upright legs interconnected by upper and lower spars;
   d) each leg comprising an elongated shell with an exterior wall intermediate a pair of lateral walls, with the exterior wall oriented to face outwardly, and the pair of lateral walls oriented transverse to the exterior wall and to face adjacent legs;
   e) each leg further comprising a top notch formed in each of the lateral walls at a top thereof and defining a pair of top notches forming a top shelf, a respective upper spar received in at least one of the pair of top notches and disposed on the top shelf;
   f) each leg further comprising a bottom notch formed in each of the lateral walls at a bottom thereof and defining a pair of bottom notches forming a bottom lip, a respective lower spar received in at least one of the pair of bottom notches, and the bottom lip being disposed on the respective lower spar; and
   g) all attachments connecting the upright legs to the upper and the lower spars being located in an interior of the upright legs, or the upper and the lower spars, or both, so that the upright legs and the upper and the lower spars have exposed surfaces free of visual attachments.

15. The table in accordance with claim 14, further comprising:
   the pair of lateral walls of each leg having outermost lateral edges defining lateral sides of the shell; and
   an elongated gap between the lateral sides of the shell.

16. A table, comprising:
   a) a stand configured to be disposed over a support surface;
   b) a tabletop coupled to and disposed upon the stand;
   c) the stand comprising upright legs interconnected by upper and lower spars;
   d) each leg comprising an elongated shell with an exterior wall intermediate a pair of lateral walls, with the exterior wall oriented to face outwardly, and the pair of lateral walls oriented transverse to the exterior wall and to face adjacent legs;
   e) each leg further comprising a top notch formed in each of the lateral walls at a top thereof and defining a pair of top notches forming a top shelf, a respective upper spar received in at least one of the pair of top notches and disposed on the top shelf;
   f) each leg further comprising a bottom notch formed in each of the lateral walls at a bottom thereof and defining a pair of bottom notches forming a bottom lip, a respective lower spar received in at least one of the pair of bottom notches, and the bottom lip being disposed on the respective lower spar; and g) a tab-and-groove connection formed between each intersecting leg and spar, including a tab extending from one of the intersecting leg and spar and into a groove in the other of the intersecting leg and spar.

17. The table in accordance with claim 16, further comprising:

the pair of lateral walls of each leg having outermost lateral edges defining lateral sides of the shell; and an elongated gap between the lateral sides of the shell.

18. A table, comprising:
a) a stand configured to be disposed over a support surface;
b) a tabletop coupled to and disposed upon the stand;
c) the stand comprising upright legs interconnected by upper and lower spars;
d) each leg comprising an elongated shell with an exterior wall intermediate a pair of lateral walls, with the exterior wall oriented to face outwardly, and the pair of lateral walls oriented transverse to the exterior wall and to face adjacent legs;
e) each leg further comprising a top notch formed in each of the lateral walls at a top thereof and defining a pair of top notches forming a top shelf, a respective upper spar received in at least one of the pair of top notches and disposed on the top shelf;
f) each leg further comprising a bottom notch formed in each of the lateral walls at a bottom thereof and defining a pair of bottom notches forming a bottom lip, a respective lower spar received in at least one of the pair of bottom notches, and the bottom lip being disposed on the respective lower spar;
g) the exterior wall comprising a pair of adjoining exterior walls interconnected at a first bend and oriented to face in substantially perpendicular directions, and defining a corner leg;
h) the pair of adjoining exterior walls disposed intermediate the pair of lateral walls with the pair of lateral walls interconnected to the pair of adjoining exterior walls at second bends, and with the pair of lateral walls oriented substantially perpendicularly with respect to one another; and
i) the first bend between the pair of adjoining exterior walls is angled and non-parallel with respect to at least one of the pair of lateral walls so that at least one of the pair of adjoining exterior walls is wider at one end and narrower at the other end.

19. The table in accordance with claim 18, further comprising:

the pair of lateral walls of each leg having outermost lateral edges defining lateral sides of the shell; and an elongated gap between the lateral sides of the shell.

* * * * *